July 23, 1935. C. F. SCHERER 2,008,929
FRAME AND AXLE STRAIGHTENING MACHINE
Filed June 13, 1932 4 Sheets-Sheet 3
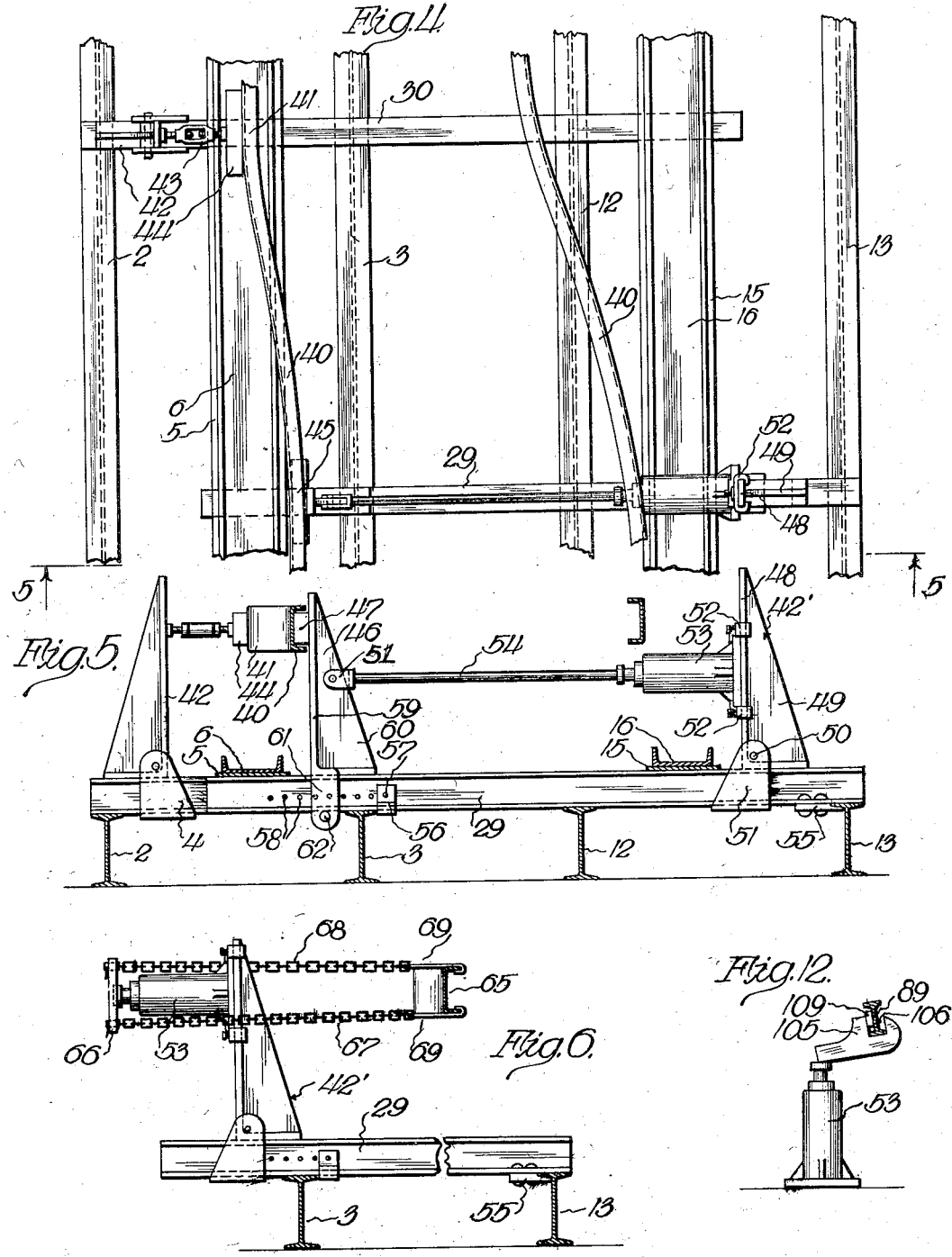
Inventor:
Charles F. Scherer
By Brown, Jackson, Boettcher & Dienner
Attys.

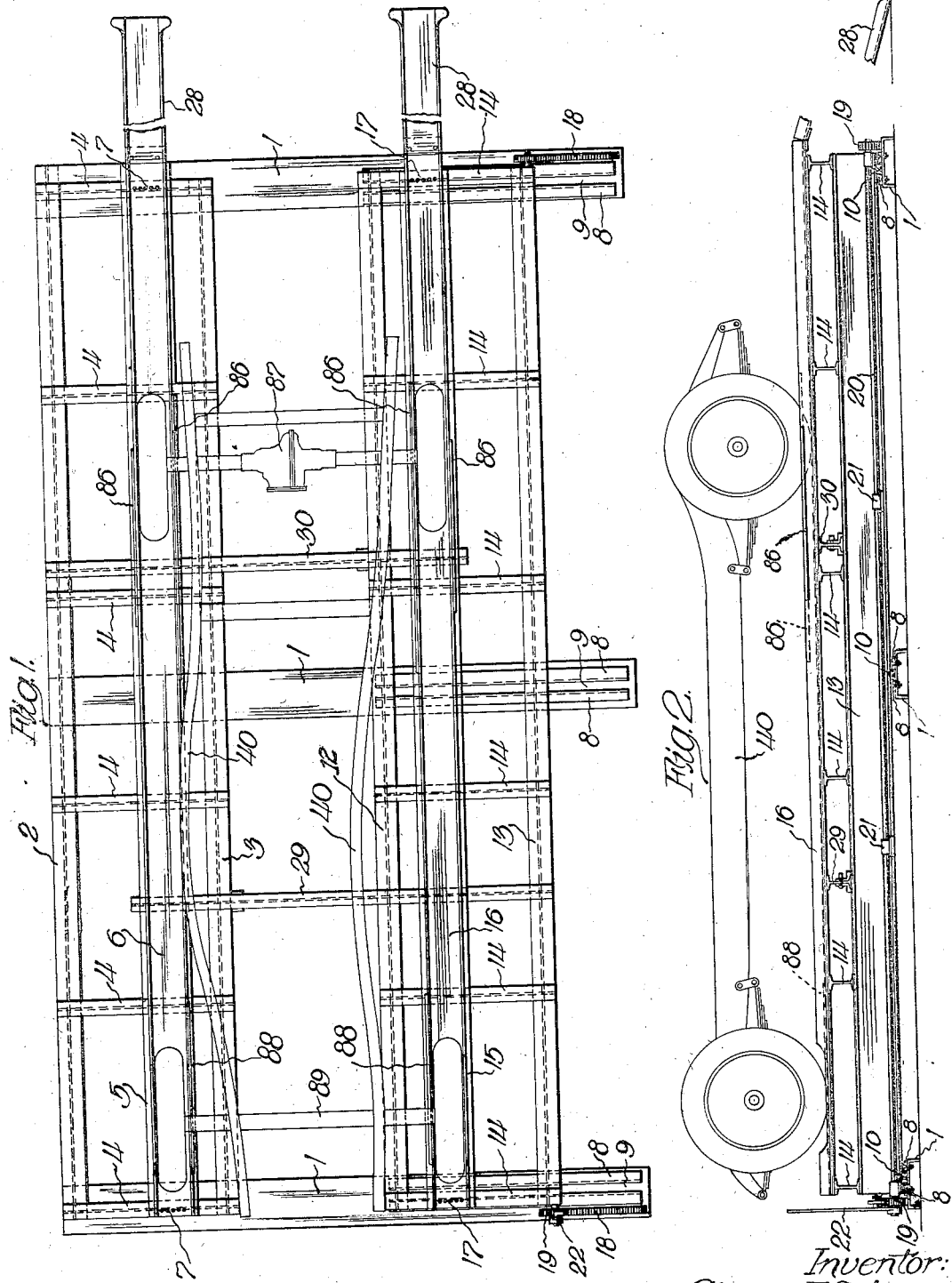

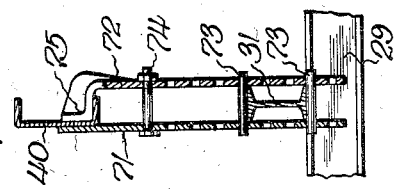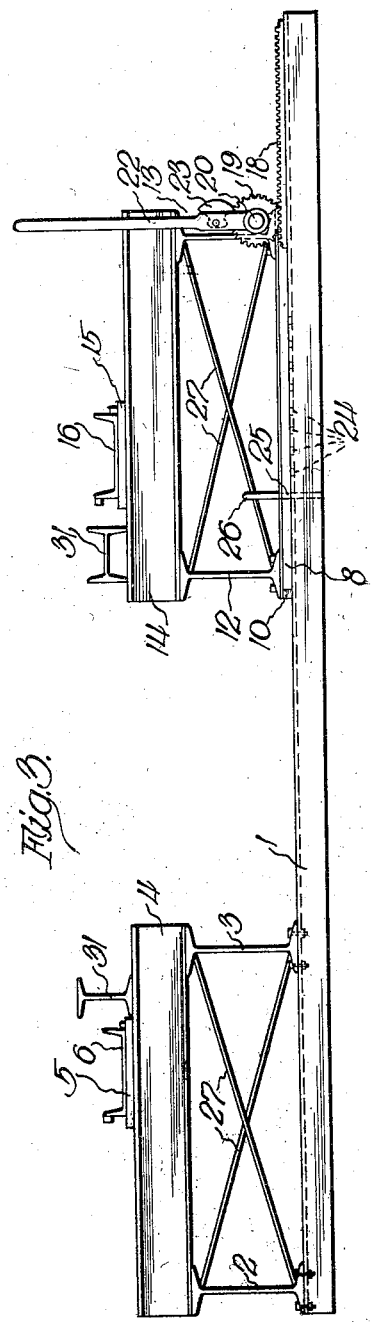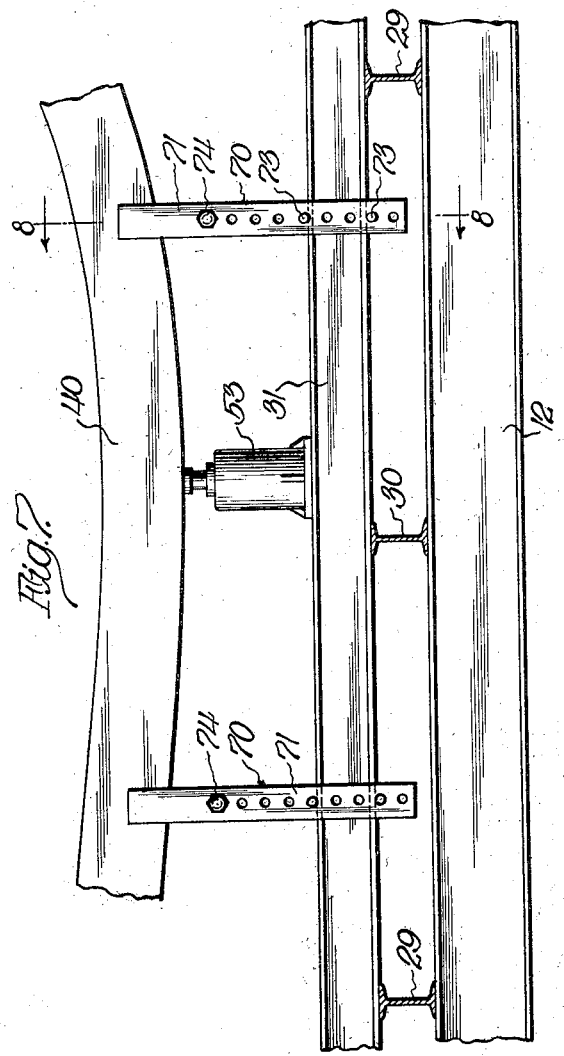

July 23, 1935.  C. F. SCHERER  2,008,929
FRAME AND AXLE STRAIGHTENING MACHINE
Filed June 13, 1932  4 Sheets-Sheet 4
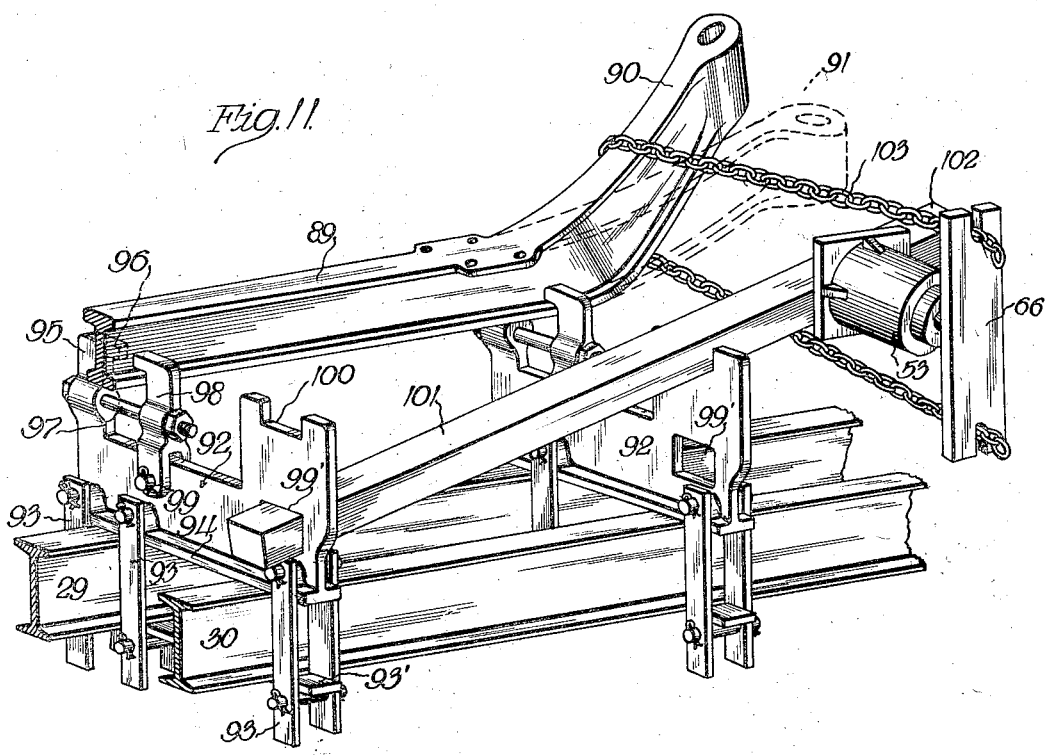
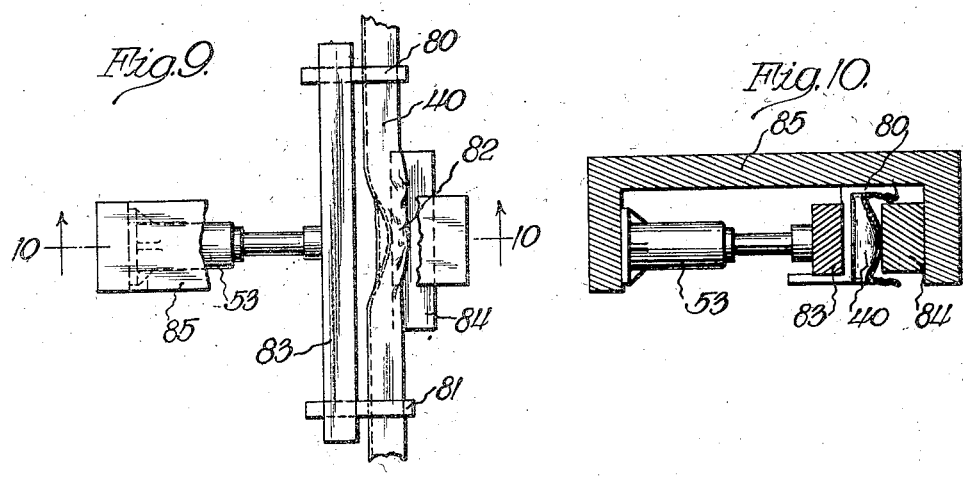
Inventor.
Charles F. Scherer
By Brown, Jackson, Boettcher & Dienner
Attys.

Patented July 23, 1935

2,008,929

UNITED STATES PATENT OFFICE 2,008,929

FRAME AND AXLE STRAIGHTENING MACHINE

Charles F. Scherer, Davenport, Iowa, assignor to Davenport Machine & Foundry Company, Davenport, Iowa, a corporation of Iowa Application June 13, 1932, Serial No. 616,792

15 Claims. (Cl. 254—88)

This invention relates to a machine for straightening frames and axles of automotive vehicles.

In the prior art of which I am aware, there are disclosed machines for straightening frames and axles of automobile vehicles, particularly pleasure cars, without removing the bodies, fenders and running boards therefrom. My invention, which is broadly an improvement upon these prior art devices, corrects certain of the inherent shortcomings of these prior art devices and thereby produces a machine of greater flexibility and utility.

In its preferred form the improved machine of my invention consists essentially of a structure which supports wheel channels into which the wheels of the vehicles are run. Inasmuch as certain of the modern day automotive vehicles have wheels disposed at standard tread distances from each other, and other vehicles have wheels disposed at a greater or lesser distance than the standard tread distance, my machine is made adjustable so that all vehicles may be accommodated in it regardless of their tread distances. This adjustability of the machine permits it to accommodate trucks and buses as well as pleasure vehicles.

After the vehicle has been placed upon the machine it is necessary for the workmen to get under it in order to perform the many operations incidental to straightening the axle and frame of the same, and to give easy access to the space under the vehicle my machine is provided with a central aisle that is clear and unobstructed. The wheel supporting channels are elevated off of the floor of the shop sufficiently to raise the vehicle so a workman may move through the aisle under it and manipulate the straightening tools therein without difficulty.

The tools by which the frame and axle of the vehicle are straightened are similar to those employed in the devices of the prior art of which I am aware, with certain improvements hereinafter noted. The machine of my invention includes a number of cross beams which register with the wheel channel supporting structure and are movable both longitudinally and laterally of that structure to position the tools properly with respect to the vehicle frame that is to be straightened. The straightening tools carried by these beams consist of a sliding knee adapted to be engaged with the vehicle frame at a point that is to be moved back into line, that is to say, at the knee of a bend, and a plurality of stationary knees adapted to engage the frame members of the vehicle at points at which no movement of the frame is desired. These stationary knees provide a mounting for the screw jacks or hydraulic jacks by which the frame is forced back into shape. The stationary knees of my machine are of a different type than those of the prior art, of which I am aware, and may be easily securely attached to the beam and at the same time are readily movable therealong when it is necessary to readjust them with respect to the vehicle frame.

In addition to the knees for removing bows or gradual bends from a vehicle frame, I provide my machine with suitable tools for supporting a jack in position to remove sharp bends or kinks from the frame. These tools anchor to the vehicle frame and are supported upon it independently of the machine upon which the vehicle is supported.

To permit straightening of front axles without removing the same from the vehicle, I have provided my machine with a set of axle knees each of which is generally C-shaped and contains a clamp located at one of its ends. This clamp is attached to the axle to hold the same in a definite position with respect to the knee. The opposite ends of the knees are provided with sockets into which a jack bar is placed and a suitable jack, such as a hydraulic jack, is mounted upon this bar and connected to the axle by a tension means so that an operation of the jack is made to pull the bent portion of the axle back into its proper position. I also provide an axle twisting hook or wrench through the use of which twists may be taken out of an axle.

Occasionally a vehicle frame will be bent downwardly and to permit correcting a fault of this kind I have provided longitudinal beams adjustably positioned in the machine and provided with clamps by which the frame is engaged and held in definite position. A screw jack or hydraulic jack may then be placed upon the beam and engaged with the frame at the point that must be elevated to correct the fault in the frame. The frame is straightened by an operation of this jack.

Inasmuch as the machine of my invention is provided with a clear aisle extending under the vehicle, the frame of the vehicle is readily accessible from its under side throughout the length of the frame, and in a majority of instances the frame can be straightened without removing the body therefrom. The advantages of an arrangement of this kind are obvious.

My invention will be best understood by reference to the accompanying drawings in which a preferred embodiment of it is shown by way of example and in which:

Figure 1 is a plan view of the machine diagrammatically showing a vehicle thereon;

Figure 2 is an elevational view of the machine shown in Figure 1;

Figure 3 is an end elevational view of the machine shown in Figure 1;

Figure 4 is a diagrammatic plan view showing the arrangement for straightening a sidewise bow in the frame of a vehicle;

Figure 5 is a view of Figure 4 taken along the line 5—5 looking in the direction of the arrows;

Figure 6 is a diagrammatic view illustrating the application of frame chains to the straightening of a vehicle frame;

Figure 7 is a diagrammatic elevational view showing the application of the machine for straightening a downwardly extending bow in the frame of a vehicle;

Figure 8 is a cross sectional view taken along the line 8—8 of Figure 7 looking in the direction of the arrows;

Figure 9 is a plan view illustrating the application of the tool for removing kinks from the frame of a vehicle;

Figure 10 is a cross sectional view taken along the line 10—10 of Figure 9 looking in the direction of the arrows;

Figure 11 is a perspective view of the tools employed to straighten a vehicle axle; and Figure 12 is an elevational view showing the application of an axle twisting tool to a front axle.

Referring now to the drawings in more detail, particularly Figures 1, 2 and 3, it will be seen that the machine of my invention comprises parallel channels 1 which are disposed transversely of the machine and rigidly fixed to the floor of the shop. These channels 1 are disposed with their webs uppermost. At one end of the channels 1 I have placed upstanding I-beams 2 and 3 which extend longitudinally of the machine and are rigidly secured to the floor channels 1. Mounted upon the upper edges of these I-beams 2 and 3 are a plurality of transverse I-beams 4 which extend between the beams 2 and 3 and are rigidly secured thereto. The beams 4 are spaced uniformly along the length of the longitudinal beams 2 and 3. A plate 5 is rigidly fixed to the top surfaces of the cross beams 4 and extends longitudinally from end to end of the machine. This plate serves as a support for the wheel channel 6 which is a channel beam laid with its web upon the plate 5 and flanges projecting upward.

At the ends of the wheel channel 6 I have drilled a plurality of spaced holes 7 through the web of the channel and adapted to register with a hole or holes in the plate 5, and to receive a pin by which the wheel channel is held upon the plate. By spacing the holes 7 uniformly, say at one inch apart, and providing two holes in the plate 5 spaced an inch and one-half apart, one-half inch adjustment of the channel laterally is possible. Both ends of the channel are so provided in order that they may be independently adjusted as will presently appear. The structure thus formed elevates the channel 6 above the floor of the shop sufficiently to place the vehicle whose frame is to be straightened at such a height that it may be conveniently worked upon. The structure just described is stationary.

On the opposite ends of each of the floor channels 1 I have provided spaced slideways 8 which together form T-shaped slots 9 disposed with their head portions adjacent the webs of the floor channels. Fitted in the slideways thus formed are T-shaped bars 10. Two parallel I-beams 12 and 13 are secured to the T bars 10 and extended longitudinally of the machine from end to end thereof. These I-beams 12 and 13 rest upon the slideways 8 and are shorter than the I-beams 2 and 3 by an amount equal to the height of the slideways 8 so that their upper surfaces lie in the same horizontal plane as the upper surfaces of the beams 2 and 3. Disposed upon the upper surfaces of the beams 12 and 13 are a plurality of short transverse I-beams 14 spaced longitudinally of the beams 12 and 13 and extending therebetween. A plate 15 is secured to the upper surface of the transverse beams 14 and extends longitudinally of the machine. A wheel channel 16 is located upon the plate 15 and held thereon by pins, not shown, projected through the holes 17 at the ends thereof and extended into corresponding holes in the plate 15. Thus it will be seen that the members 12 and 13 form a structure for supporting the wheel channel 16 above the floor at the same height as the wheel channel 6 and normally substantially parallel thereto. This structure is movable.

Upon the end ones of the floor channels 1 I have mounted racks 18 which are engaged by pinions 19 that are keyed upon a longitudinal shaft 20 journaled at 21 to the I-beam 13. At one end of the machine an operating lever 22 is also journaled upon the shaft 20 and provided with a ratchet dog 23 which engages the pinion 19. As wil be seen in Figure 3, a movement of the lever 22 in a clockwise direction will rotate pinions 19 clockwise and through the engagement of these pinions with the racks 18 the structure comprising members 12 to 16, inclusive, will be moved laterally away from the stationary structure composed of members 2 to 6, inclusive. By this arrangement the distance between the wheel channels 6 and 16 is increased to adapt the machine for receiving a vehicle having a wide tread.

The stationary structure and the movable structure are each cross-braced by suitable members 27 and are strong enough to support the largest trucks and buses now in use. Many of the larger vehicles employ dual wheels, that is to say, wheels carrying two tires. Preferably the inward ones of these tires are registered with the wheel channels 6 and 16, and the outward ones of these tires are permitted to overhang the outer flanges of the channels and are not supported.

The webs of the floor channels 1 are drilled with a plurality of holes 24, preferably spaced two inches apart. The T-bars 10 are provided with a single hole 25 through which a pin 26 is projected and registered with one of the holes 24 to lock that end of the movable frame upon the floor channel. The opposite end of the frame is similarly equipped. By operating the lever 22 to move the movable frame to within two inches of the required position, wheel channels 6 and 16 may be moved laterally an inch or one-half an inch so that the distances between the flanges of these channels may be accurately adjusted to receive the wheels of a vehicle. In the event that the rear wheels of the vehicle are spaced further apart than the front wheels of the same, one end of the wheel channels 6 and 16 can be moved outwardly upon the plates 5 and 15, respectively, to accommodate the wheels of the vehicle.

It will be noted that there is an appreciable space between the ends of the transverse I-beams 4 and 14 and the longitudinal I-beams 3 and 12 of the frames, and that an aisle is thus formed through the machine. When the machine is adjusted to receive a standard size pleasure vehicle, this aisle will be approximately three feet wide and practically as high as it is wide. A workman will experience no difficulty in moving around in the aisle under the vehicle.

As will be seen in Figures 1 and 2, one of the ends of the wheel channels 6 and 16 is provided with runway channels 28 extending downwardly therefrom to the floor to permit running the vehicle upon the machine.

The machine of my invention is provided with a plurality of tool supporting beams, preferably I-beams of suitable size, and in Figure 1 I have shown two of these beams at 29 and 30. These beams are not secured to the structures but are movable thereupon in order that they may be positioned at points most advantageous for the straightening of a particular bend in the vehicle frame. The beams 29 and 30 are long enough to span three of the four longitudinal I-beams of the structures. My machine is also provided with long tool supporting I-beams 31 adapted to extend from end to end of the frame. These beams are supported upon transverse tool supporting beams 29 and 30 and are movable thereupon so that they may be placed under the frame members of a car. When not in use, beams 31 may be stored on the inner ends of the frame members 4 and 14 alongside the wheel channels 6 and 16, in the manner shown in Figure 3.

In Figures 4 and 5 I have illustrated the manner of applying the tools of my machine to a car frame to straighten the same. In this figure 40 indicates the side members of a vehicle frame which is bent out of shape, and 41 indicates a point on the frame assumed to be correctly located with respect to the wheels of the vehicle. To hold this point 41 against movement responsive to the application of the pressure used to straighten the frame, I place a movable tool supporting beam 30 on the machine structures directly under the point 41. Upon this beam I mount a stationary knee 42 which serves as a support for one end of a turnbuckle 43. The opposite end of the turnbuckle rests against a spacing block 44 located upon the vehicle frame at the point 41. Since the knee 42 is fixed movement of the point 41 of the frame to the left, Figure 4, is prevented by the turnbuckle 43. The other end of the bend in the frame is supported by a second knee, not shown, which is similarly supported.

Directly beneath the middle or knee of the bend in the frame members 40, indicated at 45 in Figure 4, I place a second tool supporting beam 29. It will be noted that the beam 30 registers with the outer beam 2 of the structure and that the beam 29 registers with the outer beam 13 thereof. That is to say, beams 29 and 30 extend from opposite sides of the machine. As will be best seen in Figure 5 the beam 29 carries a sliding knee 46 which is registered with a spacing block 47 resting against the frame member 40 at the point 45 of the bend therein. A stationary knee indicated generally at 42' is also mounted upon the beam 29.

The stationary knees 42 and 42' each comprise an L-shaped member 48 which is reenforced by a web 49. The shorter side of the L rests upon the tool supporting beam, 29 for example. The web 49 is perforated at 50 to receive a pin by which a U-shaped clevis 51 is supported upon the knee. This clevis encircles the supporting beam.

A jack 53 is mounted upon the longer leg of the knee 42' by the brackets 52 and connected by a jack bar 54 to the sliding knee 46. When the jack is operated to move the sliding knee to the left, Figure 5, it exerts a pressure upon the stationary knee 42' which tends to rotate that knee in a clockwise direction about the pin 50, with the result that the clevis 51 is tightly drawn against the beam 29 and the knee 42' thereby securely locked upon that beam.

The beam 29 is provided with a stop block 55 which engages the frame beam 13 and thereby prevents the beam 29 from moving to the right, Figure 5, with respect to the machine. The beam 29 is also provided with a U-shaped block 56 supported upon a pin 57 projected through one of a number of holes 58 in the beam so as to bring the block 56 against the frame beam 3. By this arrangement movement of the channel 29 in an opposite direction is prevented.

The sliding knee indicated generally at 46 consists of an L-shaped member 59 reenforced by a web 60 and containing parallel extending arms 61 which overhang the beam 29. A pin 62 is extended through perforations in the ends of these arms and rests against the under side of the beam 29; however, this pin does not clamp the sliding knee to the beam 29, and that knee is therefore capable of being moved longitudinally of the beam by the jack 53.

The jack 53 is preferably a hydraulic jack capable of exerting a pressure of several tons. As it is operated to move its thrust rod to the left, Figure 5, sliding knee 46 is moved along the beam 29 by the rod 54 and the frame member 40 is thereby cold pressed back into shape. The I-beam 30, upon which the stationary jack 42 is supported, is provided with a stop block similar to 55 resting against the channel beam 2 of the frame so that the pressure placed upon the knee 42 by the frame member 40 is transmitted to the frame of the machine.

Through the use of the sliding knee 46 and jack bar 54, the jack knee 42' can be placed outside of the frame of the vehicle as shown. In certain instances it may be advantageous to place this jack knee under the vehicle, in which case the jack 53 is raised so that its thrust rod bears directly against the spacer block 47 in the channel of the frame member. Since this application of the jack is quite apparent, it has been omitted from the drawings to avoid an unnecessary complication thereof.

In certain instances where the frame of a vehicle is bent alongside the motor, or at some other point which is obstructed by equipment disposed between the side members of the frame, it will be impossible to place the sliding knee or the jack knee in such a position that the frame can be pushed back into line in the manner shown in Figure 5. My improved machine permits handling a situation of this kind by placing jack knee 42' upon the beam 29 on the outside of the vehicle frame member 65. Jack 53 is supported upon the knee 42' as before, and equipped with a cross head 66 with which pull chains 67 and 68 are engaged. These chains are provided with hooks 69 which engage the flanges of the frame member 65, so that an operation of the jack 63 will pull the frame back into place.

In the event that one of the frame members 40 of the vehicle is bent downwardly, longitudinal beam 31 is placed under it in the manner shown in Figure 7 and supported upon a suitable number of cross beams 29 and 30. Clamps 70 are engaged with the frame member 40 at the ends of the bent portion thereof, and a jack 53 is set upon the I-beam 30 with its thrust rod registered with the frame member 40. A suitable spacing block, not shown, may be placed upon the frame member 40 to distribute the pressure placed thereon by the jack. An operation of the jack will straighten the member 40 in the obvious manner.

As will be seen in Figure 8, the clamp 70 comprises a perforated planar member 71 and a companion clamping member 72 which is correspondingly perforated. Pins 73 extend through the perforations in these members and rest upon the upper and lower surfaces of the I-beam 31 to hold the clamp thereupon. A bolt 74 draws the clamp together to thereby secure the vehicle frame member 40 in it. It will be noted that the member 72 is shaped to fit within the channel portion of the frame member 40 and to engage the web thereof as shown at 75. When so clamped the frame member 40 is definitely located with respect to the I-beam 31.

Small kinks contained in the members of the vehicle frame are removed in the manner illustrated in Figures 9 and 10. Hooklike members 80 and 81 are placed over the frame member 40 on opposite sides of the kink 82 therein, and a jack bar 83 is supported on these hooks. A spacing block 84 is disposed within the frame member 40 against the knee of the kink, and a jack knee 85 is registered with this block. This jack knee 85 is generally C-shaped and extends over the top edge of the frame member 40 and therebeyond to receive the jack 53 by which the kink is straightened. The pressure rod of the jack 53 is registered with the jack bar 83. An operation of the jack 53 will move the jack knee 85 to the left, Figure 10, and carry with it the spacing block 84 to thereby force the kink 82 into line with the frame member 40. By proper manipulation of this tool small kinks can be removed from the frame members.

Alignment of the vehicle is checked by scale means 86 located upon the wheel channels 6 and 16. The rear axle 87 of the car is positioned at right angles to the wheel channels, and this position checked by a carpenter's square registered with the axle and with the scales 86. In this manner one part of the car is aligned true with the machine and used as a reference point for determining when the entire vehicle is properly aligned. In certain instances, when the frame of the vehicle is not badly wrecked, this aligning may be made prior to performing any straightening operations. In other instances, when the frame is badly wrecked, straightening prior to aligning the vehicle may be advantageous. Similar scales 88 are located upon the wheel channels adjacent the front axle 89 of the vehicle to facilitate aligning that axle at right angles to the wheel channels 6 and 16. Since the frame members 40 of the vehicle are readily accessible from the under side of the same, and since the aisle between the stationary and movable channel supporting structures of the machine permits free access to the under side of the vehicle frame, it is an easy matter to apply suitable straight edges to the frame to determine when it has been brought back into its proper shape.

In Figure 11 I have illustrated the manner in which bent front axles may be straightened. The axle 89 is shown with its arm portion bent backwardly as indicated at 90, the proper position for that arm being shown by dotted lines 91. To facilitate straightening such a bend, tool supporting beams 29 and 30 are placed under the axle and axle knees 92 are placed thereon and held in place by the locking clevises 93, which register with a bar 93' disposed beneath the beams.

Each of the knees 92 consists of a generally C-shaped main body flanged at 94 to facilitate maintaining it in an upright position upon the tool supporting beams 29 and 30. The locking clevises 93 are secured to the main body of the clamp adjacent this flange. At one end of the main body an arm 95 extends upward and terminates in an inwardly projecting boss 96 which is adapted to be registered with the web section of the axle 89. This arm 96 carries a through bolt 97 which also extends through a correspondingly formed clamping member 98 that is pivoted to the main body of the knee at 99. By tightening the through bolt 97 the axle 89 is clamped in the knee.

The opposite arm of the knee contains a rectangular socket 99' and a semi-rectangular socket 100 recessed into the free end of the same.

As shown, two knees 92 are engaged with the axle 89, and a jack bar 101 is registered at one end with the socket 99' in one of the knees. The bar 101 is supported near its median line by the socket 100 in the other knee, and is therefore disposed at such an angle that its free end 102 is in the same horizontal plane as the arm portion 90 of the axle 89. A jack 53 is placed upon this free end of the jack bar 101, and this jack is provided with a cross head 66 with which the chain 103 is registered. This chain encircles the bent portion of the axle and upon an operation of the jack 53 pulls that portion back into its proper place. The axle 89 is held against movement responsive to the operation of the jack 53 by the clamping members engaged with it, so that the stresses set up by the jack are entirely taken up by the jack knees 92 and the jack bar registered therewith.

In the event that the axle 89 is twisted as well as bent to the rear as shown in Figure 11, the tools shown in Figure 12 may be employed to straighten or untwist the same. This tool comprises a wrenchlike lever 105 having a socket 106 adapted to be registered with the axle 89. A suitable spacing block 109 may be interposed adjacent the web of the axle if desired. The free end of the lever 105 is registered with the thrust rod of a jack 53, which may conveniently be supported upon a tool supporting beam such as 29 or 30. An operation of the jack will twist the axle into shape. Preferably the axle is clamped by axle knees 92 during the time that it is being twisted back into shape to eliminate the lifting of the axle by the operation of jack 53.

With the machine herein described, an automobile, truck, or bus, which has been wrecked by having its frame or axle bent out of shape, can be quickly and economically repaired without tearing down the vehicle by removing the body, motor, running boards and so forth. All of the bending of the frame and axle is done cold, and consequently the hardness of these members is not changed by heating the same. With proper manipulation of the tools herein disclosed the frame can be made preferably straight quickly and economically.

While I have chosen to show my invention by illustrating a preferred embodiment of it, I have done so by way of example only, and there are many adaptations and modifications which can be made by one skilled in the art within the teachings of the invention.

What I consider new and desire to have protected by Letters Patent is pointed out in the appended claims.

What is claimed is:

1. A frame and axle straightening machine comprising a pair of generally rectangular structures disposed with their adjacent sides substantially parallel and spaced apart to form an aisle, a channel runway carried on the top of each of said structures, means for adjusting the position of said runways with respect to the structures, inclined members extending from said runways downwardly to the floor to permit moving a vehicle up onto said machine, scale means on said runways for facilitating aligning the vehicle with the machine, movable members extending between said structures and beneath said runways for receiving and supporting straightening tools, and means for securing said members to said structures.

2. A frame and axle straightening machine comprising a pair of generally rectangular structures disposed with their adjacent sides substantially parallel and spaced apart to form an aisle, a channel runway carried on the top of each of said structures, means for adjusting the positions of said runways with respect to the structures, inclined members extending from said runways downwardly to the floor to permit moving a vehicle up onto said machine, scale means on said runways for facilitating aligning the vehicle with the machine, movable members extending between said structures and beneath said runways for receiving and supporting straightening tools, and means including a stop block attached to each movable member and engageable with a structure member for securing said members to said structures.

3. In a vehicle frame and axle straightening machine, a stationary structure comprising a plurality of longitudinal members, transverse members disposed on top of said longitudinal members, a wheel channel disposed longitudinally of the structure and upon said transverse members, means for securing said channel to the structure, said means permitting adjustment of each end of the channel laterally of the structure independently of the other end, a movable structure similar to said stationary structure and disposed in juxtaposition thereto, and means carried on said movable structure for moving the same away from and toward said stationary structure.

4. In a vehicle frame and axle straightening machine, a stationary structure comprising a plurality of longitudinal members, transverse members disposed on top of said longitudinal members, a wheel channel disposed longitudinally of the structure and upon said transverse members, means for securing said channel to the structure, said means permitting adjustment of each end of the channel laterally of the structure independently of the other end, a movable structure similar to said stationary structure and disposed in juxtaposition thereto, means carried on said movable structure for moving the same away from and toward said stationary structure and means for locking said movable structure against movement with respect to said stationary structure.

5. A vehicle frame and axle straightening machine comprising a plurality of channel members laid channel side down upon a floor and secured thereto, a stationary structure extending between said members at one of the ends thereof, a wheel channel supported upon the top of said structure with its channel side up, a similar but movable structure extending between said channels near the opposite ends thereof and containing also a wheel channel, means for moving said movable structure longitudinally of said channels toward and away from said stationary structure to space the structures apart properly to receive the wheels of a vehicle in said wheel channels and to form a clear aisle extending longitudinally of the machine between the structures, and channel means extending from said wheel channels to the floor to permit moving a vehicle up onto said machine.

6. In combination in a machine of the character described, two supporting structures disposed in spaced parallel relation, means for adjusting one of the structures toward and away from the other structure, runways mounted on said structures, one of the runways being adjustable transversely of its associated supporting structure, and means for securing the adjustable runway in adjustment.

7. In combination in a machine of the character described, two supporting structures disposed in spaced parallel relation and adjustable one toward and away from the other, and runways mounted on said structures and adjustable transversely thereof.

8. In combination in a machine of the character described, two supporting structures disposed in spaced parallel relation and adjustable one toward and away from the other, and runways mounted on said structures and adjustable transversely thereof, said runways being positionable on the supporting structures to extend parallel therewith or at an inclination lengthwise thereof, optionally.

9. In combination in a vehicle frame and axle straightening machine, a base structure, two supporting structures mounted on the base structure in spaced parallel relation, runways carried by the supporting structures, one of the supporting structures being slidably mounted on the base structure and movable transversely thereof toward and away from the other supporting structure, and cooperating means carried by the base structure and the slidably mounted supporting structure for effecting adjustment of the latter transversely of said base structure.

10. In combination in a vehicle frame and axle straightening machine, a base structure, two supporting structures mounted on the base structure in spaced parallel relation, runways carried by the supporting structures, one of the supporting structures being slidably mounted on the base structure and movable transversely thereof toward and away from the other supporting structure, a shaft rotatably mounted on the slidable supporting structure, and cooperating means carried by the shaft and the base structure for effecting adjustment of said slidable supporting structure transversely of said base structure.

11. In combination in a vehicle frame and axle straightening machine, a base structure, two supporting structures mounted on the base structure in spaced parallel relation, runways carried by the supporting structures, one of the supporting structures being slidably mounted on the base structure and movable transversely thereof toward and away from the other supporting structure, a shaft rotatably mounted on the slidable supporting structure, racks secured to the base structure, and pinions secured to said shaft and cooperating with said racks for effecting adjustment of said slidable supporting structure transversely of said base structure.

12. In combination in a vehicle frame and axle straightening machine, two supporting structures disposed in spaced parallel relation, runways supported by said structures, each of said structures comprising beams extending lengthwise thereof below the runway, cross-members seating upon said beams and adjustable lengthwise thereof, means cooperating with the beams for holding the cross-members against movement across said beams, and tool receiving members mounted on the cross-members and adjustable lengthwise thereof, said tool receiving members projecting upward from the cross-members and being of proper height for supporting bending tools in position to exert pressure substantially parallel to said cross-members and against the side members of the frame of a vehicle supported upon said runways.

13. In combination in a vehicle frame and axle straightening machine, two supporting structures disposed in spaced parallel relation, runways supported by said structures, each of said structures comprising beams extending lengthwise thereof below the runway, cross-members seating upon said beams and adjustable lengthwise thereof, means cooperating with the beams for holding the cross-members against movement across said beams, tool receiving members mounted on the cross-members and adjustable lengthwise thereof, said tool receiving members projecting upward from the cross-members and being of proper height for supporting bending tools in position to exert pressure substantially parallel to said cross-members and against the side members of the frame of a vehicle supported upon said runways, and means carried by the tool receiving members and cooperating with said cross-members for holding said receiving members against movement lengthwise of the cross-members under pressure exerted by the bending tools.

14. In combination in a vehicle frame and axle straightening machine, two supporting structures disposed in spaced parallel relation, runways supported by said structures, each of said structures comprising beams extending lengthwise thereof below the runway, cross-members seating upon said beams and held against movement thereacross, and tool receiving members mounted on the cross-members and adjustable lengthwise thereof, said tool receiving members projecting upward from the cross-members and being of proper height for supporting bending tools in position to exert pressure substantially parallel to said cross-members and against the side members of the frame of a vehicle supported upon said runways.

15. In combination in a vehicle frame and axle straightening machine, two supporting structures disposed in spaced parallel relation, runways supported by said structures, cross-members extending between the supporting structures and held against movement transversely thereof, and tool receiving members mounted on the cross-members and adjustable lengthwise thereof, said tool receiving members projecting upward from the cross-members and being of proper height for supporting bending tools in position to exert pressure substantially parallel to said cross-members and against the side members of the frame of a vehicle supported upon said runways.

CHARLES F. SCHERER.